March 22, 1966 N. T. FALKENBLAD ETAL 3,241,598
METHOD AND APPARATUS FOR EVAPORATING LIQUIDS
Filed March 12, 1962

INVENTORS
Nils Tore Falkenblad
Bengt Hilding Hallström
Inge Brox
BY
Davis, Hoxie, Faithfull + Hapgood
Attorneys

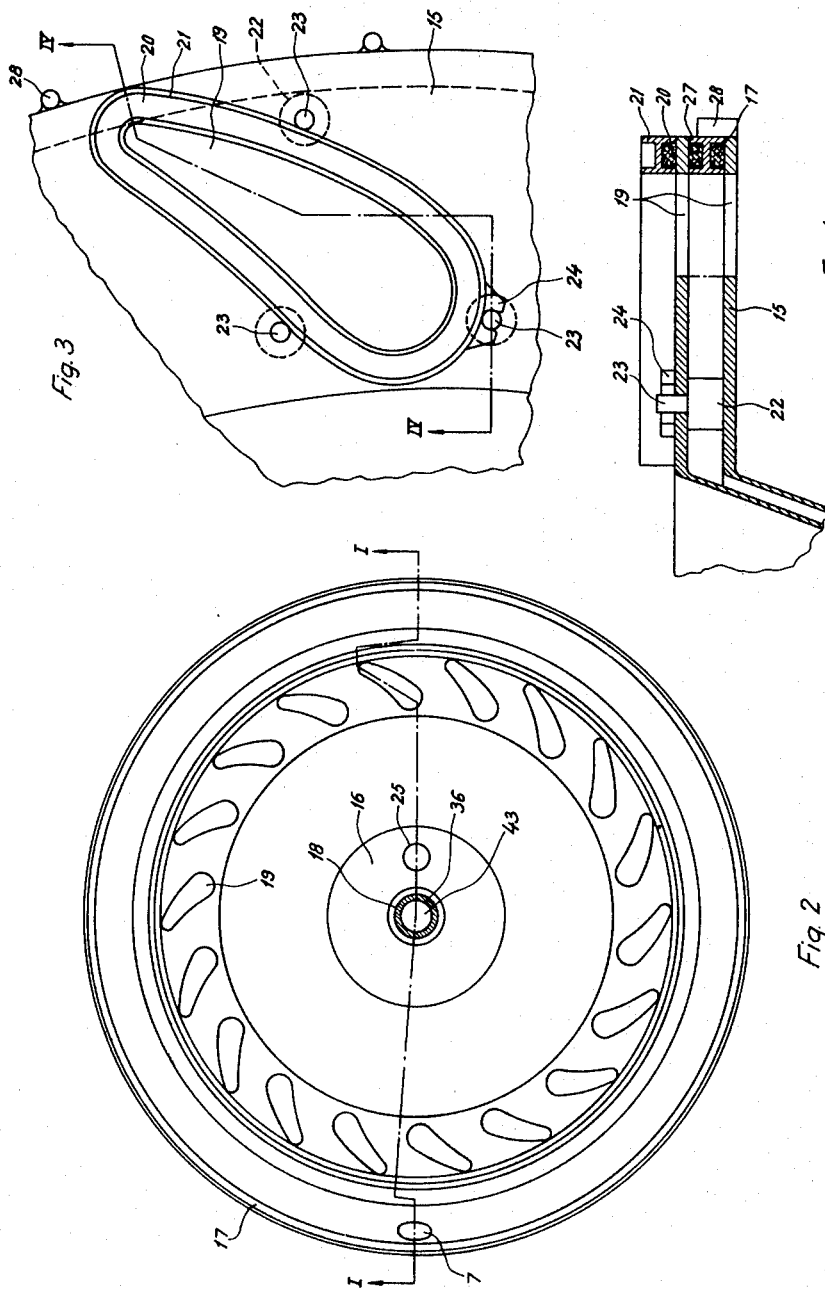

United States Patent Office 3,241,598
Patented Mar. 22, 1966

3,241,598
METHOD AND APPARATUS FOR EVAPORATING LIQUIDS
Nils Tore Falkenblad, Bengt Hilding Hallström, and Inge Brox, Lund, Sweden, assignors to Aktiebolaget Separator, Stockholm, Sweden, a corporation of Sweden
Filed Mar. 12, 1962, Ser. No. 179,039
Claims priority, application Sweden, Mar. 15, 1961, 2,740/61
14 Claims. (Cl. 159—28)

This invention relates to a method and apparatus for the evaporation and concentration of liquids by application of heat. Enclosed systems of this type are used where it is desired to collect the vapor products for a specific secondary purpose or to utilize them for concentrating the liquid at the temperature most suited thereto. In such systems, the evaporation can be effected at, above or below atmospheric pressure.

Prior known evaporating devices have utilized heat-exchangers of either the "tube" or "plate" type. The "plate" type heat-exchanger comprises a series of thin metallic plates spaced a short distance apart to form intervening interspaces alternates of which are arranged as a transmission path for a heat emitting medium and the remainder of which are arranged to transmit the medium to be evaporated, whereby the heat-exchange takes place through the thin heat conducting partition plates.

"Plate" type heat-exchangers have the advantage of having a greater flexibility in that plates may be added or removed as desired to alter the configuration of the evaporator as desired. These "plate" type heat-exchangers have a disadvantage in that they require separate containers for receiving the concentrated liquid and the vapors emitted from the liquid. This necessitates rather complicated plate designs in order to obtain satisfactory operating conditions for efficient evaporation and condensation. The requirement of distinct separating containers is most acute where multistage evaporators are employed. A further disadvantage of the "plate" type heat-exchanger arises where substantial pressure differentials are to be maintained between the two media which are separated by the plates. This necessitates the use of special supporting means between the plates, which interfere with and impede the flow through the restricted channels.

There is another known apparatus, the so-called "frusto-conical" heat-exchanger, which functions as a heat-exchanger between two media. The "frusto-conical" device comprises a series of conical mantles nested within each other but spaced apart so as to form media flow interspaces arranged, as heretofore described, to alternately conduct the heat transmitting and the heat receiving media. However, these "frusto-conical" heat-exchangers have not been utilized as evaporators but merely as pasteurizers or sterilizers, in a limited number of applications.

This invention relates to a new method of evaporation and to new apparatus for carrying out that method. The apparatus is an improved form of the basic "frusto-conical" heat-exchanger. The prior known frusto-conical heat-exchangers are not directly useable to carry out the evaporation process. To achieve that purpose it is necessary to modify the design and fabrication of the heat-exchanger and to modify the circulatory system of the heat-exchanging media with special attention being given to the means of maintaining the proper pressure and temperature conditions of the two media during their flow to and from the apparatus.

A feature of the invention involves the arrangement of gaskets between the conical mantles in such a way as to allow the two media to flow counter-currently to each other in the respective mantle interspaces, and to facilitate the admission and discharge of the media to and from their respective interspaces. The apparatus also includes a receiving chamber into which the evaporated medium is fed and where the vapor may be separated from the concentrate and discharged separately.

A further feature is the arrangement of the internested mantles on a vertical axis with their largest diameter end portions disposed uppermost. Another feature resides in the manner in which the counter-flow of the respective media is effected by introducing the liquid to be evaporated into the corresponding conically shaped heat-exchange spaces at their smaller diameters and discharging it from their larger diameters, while the heat-emitting medium flows in the opposite direction through the corresponding conical interspaces.

The effect of these features is to create a system whereby the liquid to be processed is introduced into conical heat-exchange spaces of progressively increasing volume which more nearly match the volumetric expansion of the liquid resulting from the added heat as well as the expansion due to the formation of vapor bubbles therein, and whereby the heat-emissive medium, usually steam, is introduced into conical spaces of decreasing volume to correspond with the decreasing volume of this medium as its heat is given up during operation.

In comparison with plate type heat-exchangers the present invention has the advantage that the spacing between the conical mantles remains essentially constant and independent of a pressure differential between opposite sides of a mantle, since such a pressure differential results in a pull or thrust on the mantle which does not deform or displace it relative to the others, contrary to the situation in the plate systems. This avoids the necessity of providing auxiliary supporting inserts between mantles, as would be required in the plate type construction.

According to the present invention, the method of utilizing the described heat-exchanger having a series of frusto-conical chambers or channels comprises:

(1) Introducing the liquid to be evaporated into alternate channels at their smaller diameters and discharging it at their larger diameters, (2) Introducing the heat-emitting medium into the remaining channels at their larger diameters and discharging it at their smaller diameters, and (3) Maintaining the pressure and temperature relationships between the heat-emitting medium and the vapor of evaporation in such a manner that the vapor at the outlet chamber follows, at the existing pressure, the vaporization curve for the liquid to be evaporated.

This means that if the in-flowing heat-emitting medium is steam at the atmospheric pressure, the pressure of the evaporated liquid (if that liquid constitutes an aqueous solution) at the outlet side must be below the atmospheric pressure if a boiling of the liquid to be evaporated is to occur during the heat exchange process. Likewise, if the pressure of the medium to be evaporated is, at the outlet side, equal to or higher than the atmospheric pressure, the pressure of the in-flowing heat-emitting medium must be higher than both last-mentioned pressures.

Apparatus for carrying out the method of the invention requires modification of the frusto-conical heat-exchanger of the prior art, in which the conical mantles are provided at their larger diameter with radially outwardly directed flanges and at their smaller diameter with radially inwardly directed flanges, between certain of which flanges outer marginal gaskets are disposed at the free edges of the flanges and inner gaskets are disposed around axial holes in the flanges. These flanges are maintained in a compressed relationship against each other and against the gaskets by means of thrust-plates. These thrust-plates are disposed respectively against the upper and lower inwardly directed flanges of a stack of conical mantles, and a bolt provided with a nut maintains the thrust-plates in this compressive relation. The principal features of the frusto-conical evaporator, according to the invention, are that every second channel, defined by two mantles and their inwardly and outwardly directed flanges, is provided with a marginal gasket between the flanges at the free edges of their inwardly as well as outwardly directed flanges in such a way that each such channel forms a closed chamber or closed channel, as distinguished from the remaining alternate channels which are open between the inwardly directed flanges as well as between the outwardly directed flanges and thus are called open channels. All inwardly and outwardly directed flanges, with the exception of the uppermost or lowermost one of the respective flanges, are provided with pairs of holes which face each other in the open channels. Gaskets are fitted between the flanges around these opposing holes of the open channels in such way that the holes and gaskets form conduit means between the closed channels. The compression bolt is provided with an axial cavity which, via radial passages, is in communication with the open channels.

Other characteristics of the method and of the conical evaporator according to the invention are explained more in detail below, with reference to the attached drawings which illustrate two embodiments of the invention.

FIG. 2 is a section through FIG. 1 along the section line II—II;

FIG. 3 shows, on an enlarged scale, a portion of an outwardly directed flange of a mantle shown in FIGS. 1 and 2 and illustrates in detail a hole in the flange with its surrounding gasket;

FIG. 4 is a sectional view along the line IV—IV in FIG. 3;

Figure 1:
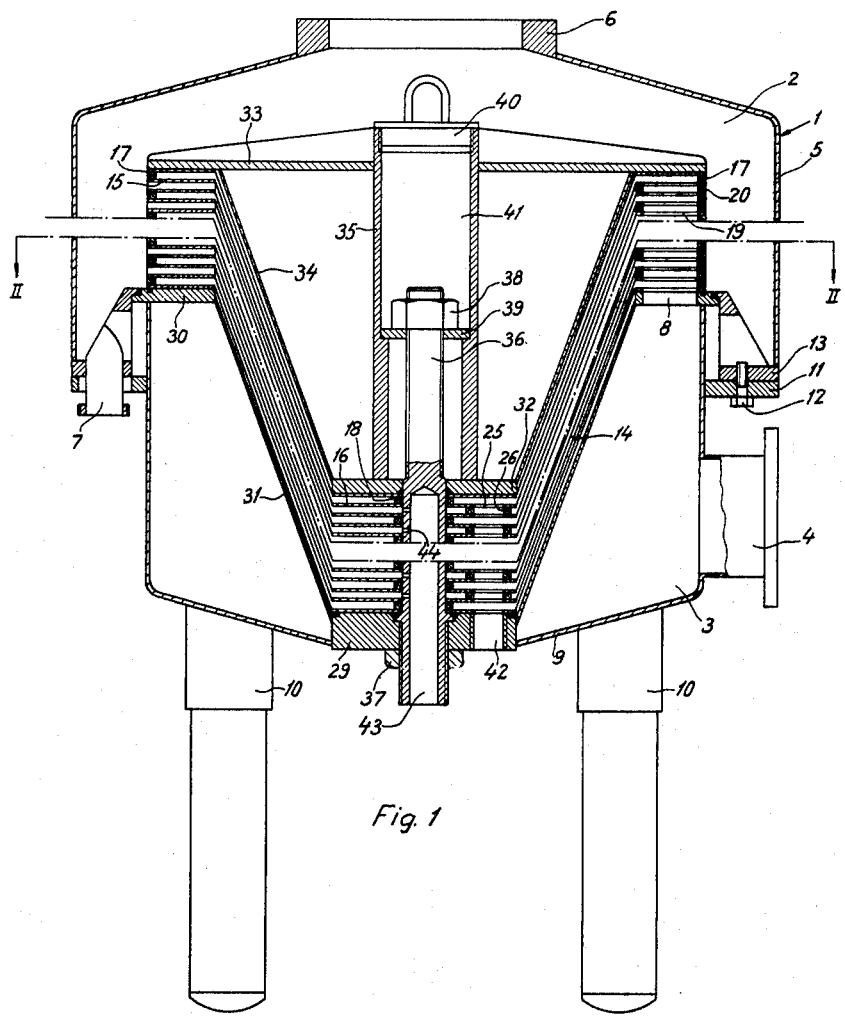
FIG. 1 shows schematically a vertical section through a conical evaporator taken along the section line I—I in FIG. 2.

The conical evaporator according to FIG. 1 comprises a casing 1 with an upper chamber 2 for receiving liquid and vapor from the liquid after its evaporation, and a lower chamber 3 for receiving the heat-emitting medium initially introduced through a steam inlet 4. The wall 5 of the chamber 2 is provided with a central steam outlet 6, which is preferably connected to a vacuum exhausting device (not shown), and with a concentrate outlet 7 for the evaporated concentrated liquid. Reference numeral 8 designates the steam inlet to the channels of the conical evaporator proper, which channels are formed by the conical mantles 14. The bottom 9 of the chamber 3 rests on legs 10 and supports, by means of the flange 11 and the bolts 12, the wall 5 of upper chamber 2. Wall 5 has a corresponding flange 13 in which threaded holes for the bolts 12 are arranged.

The frusto-conical mantles 14 are provided at their larger diameter with radially outwardly directed flanges 15 and at their smaller diameter with radially inwardly directed flanges 16. The mantles 14 are nested together but are spaced a short distance from each other and are arranged with the axis vertical and with the larger diameter uppermost and the small diameter lowermost. Channels are thus formed between the mantles and their flanges, alternate channels being used for the evaporation liquid and the other channels for the heat-emitting medium. The latter channels are closed at their outer portions by annular gaskets 17 between the corresponding outer flanges 15 and at their inner portions by annular gaskets 18 between the corresponding inner flanges 16. The remaining channels are open between their inner and outer flanges and therefore are called open channels, which are intended for the evaporation liquid.

Throughflow holes 19 are provided in all outwardly directed flanges 15 (see also FIGS. 2, 3 and 4) with the exception of the uppermost flange. Gaskets 20 are arranged around the holes 19 between the flanges of the open channels. In order to stabilize the gaskets, they can be arranged in annular frames 21 provided with open grooves located opposite to each other on opposite sides of the frame, in which grooves the gaskets 20 are fitted. These frames, fitted with the gaskets, thus serve as spacing members between the flanges. In order to maintain the frames in position, spacing members 22 may be arranged between the flanges with pins 23 passing through the flanges. In FIG. 3, three pins 23 support the frame 21. The frame 21 may be provided with a projection 24, which partly surrounds the pin 23. The holes 19 in the flanges and the gaskets 20 around said holes form a communication conduit or passage from the steam inlet 8 so that the steam can flow into all closed channels but cannot enter the open channels.

In the same way as in the outwardly directed flanges, holes 25 are provided in the inwardly direced flanges 16; and gaskets 26, with frames similar to the frames 21, are arranged around the holes 25 between the inner flanges in the open channels. Thus a passage is also formed through all inwardly directed flanges with the exception of the uppermost flange, which passage is in communication with all closed channels but is shut off from communication with the open channels. This passage forms an outlet for the heat-emitting medium from the closed channels, as will be described more in detail below. Special spacing members similar to the spacing members 22 can be fitted between the inwardly directed flanges.

The inner and outer marginal gaskets 17 and 18 may also be disposed in frames 27 similar to the frames 21 (see FIG. 4). In order to maintain these frames 27 in position, the flanges can be provided with peripherally adapted studs 28 serving as supporting and guiding members (FIGS. 3 and 4).

The lower chamber 3 is provided at its lower part with a thrust-plate 29 and at its upper part with a supporting plate 30. These plates are firmly secured to each other by means of a conical wall 31.

The conical mantles 14 are nested together and rest with the lowermost inwardly directed flange 16 upon the thrust-plate 29 and with the lowermost outwardly directed flange 15 upon the supporting plate 30. Another thrust-plate 32 rests upon the uppermost inwardly directed flange 16. A third thrust-plate 33 rests upon the uppermost outwardly directed flange 15 and is firmly secured to the thrust-plate 32, partly by means of a conical wall 34 and partly by means of a central sleeve 35. A central bolt 36 is secured to the thrust-plate 29 by means of a nut 37 and extends through said thrust-plate, through all the inwardly directed flanges and through the thrust-plate 32 and presses, by means of a nut 38 and a washer 39, the sleeve 35 and the thrust-plate 32 toward the thrust-plate 29 so that all the gaskets between the inwardly directed flanges are compressed to effect a tight sealing.

The nut 38, acting through washer 39 and sleeve 35, also presses the thrust-plate 33 against the supporting plate 30 so that all gaskets between the outwardly directed flanges are compressed to effect a tight sealing. A plug 40 is screwed into the upper end of the sleeve 35 and obturates the cavity 41 of said sleeve.

The thrust-plate 29 is provided with a hole 42 which communicates through holes 25 with the closed channels and is intended to be connected to a pipe (not shown) serving as an outlet for the heat-emitting medium from these closed channels, usually condensed heat-emitting medium.

The bolt 36 is provided with an axial recess or channel 43 which forms an inlet for the liquid to be evaporated. The recess 43 is in communication with the open channels by means of passages 44 arranged radially or essentially radially, the open channels discharging into the upper chamber 2 at the periphery of the outwardly directed flanges.

Owing to the shape which, according to FIG. 3, has been given to the gasket 20 and to its frame 21, the frame will exert in the open channels a directing action on the outflowing evaporation liquid, so that said liquid, which consists of a mixture of vapor and concentrate, will be discharged more or less tangentially and receives a rotating motion in the chamber 2, whereby the liquid particles are thrown against the wall of the chamber and are separated from the vapor particles. The liquid is discharged through the outlet 7 and the vapor is exhausted through the outlet 6.

The conical evaporator according to FIGS. 1–4 operates as follows: The heat-emitting medium, preferably steam, enters the chamber 3 through the inlet 4 and passes via the inlet 8 to the passage formed by the holes 19 and the gaskets 20. From this passage it flows into the closed channels between the mantles 14 and, at the flanges 16, discharges to the outlet 42 via the passage formed by the holes 25 and the gaskets 26. During such flow the steam condenses and its volume decreases, owing to heat being given up to the evaporation liquid.

The evaporation liquid is fed in through the axial recess 43 and passes through the passages 44 into the open channels between the mantles, and is discharged from said channels between the outwardly directed flanges 15 and enters the chamber 2, from which vapor is discharged through the outlet 6, preferably to a vacuum-source, while concentrated liquid is discharged through the outlet 7. The heat-emitting and heat-absorbing media thus pass each other in counter-current, although the flow direction of the heat-emitting medium could be reversed if required for any reason.

In order to obtain a perfect sealing between the parts of the apparatus, gaskets may be provided in more places than indicated above, as will be evident to those skilled in the art.

Figure 6:
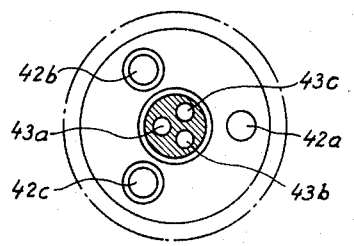
FIG. 6 is a sectional view along the line VI—VI in FIG. 5.
Figure 5:
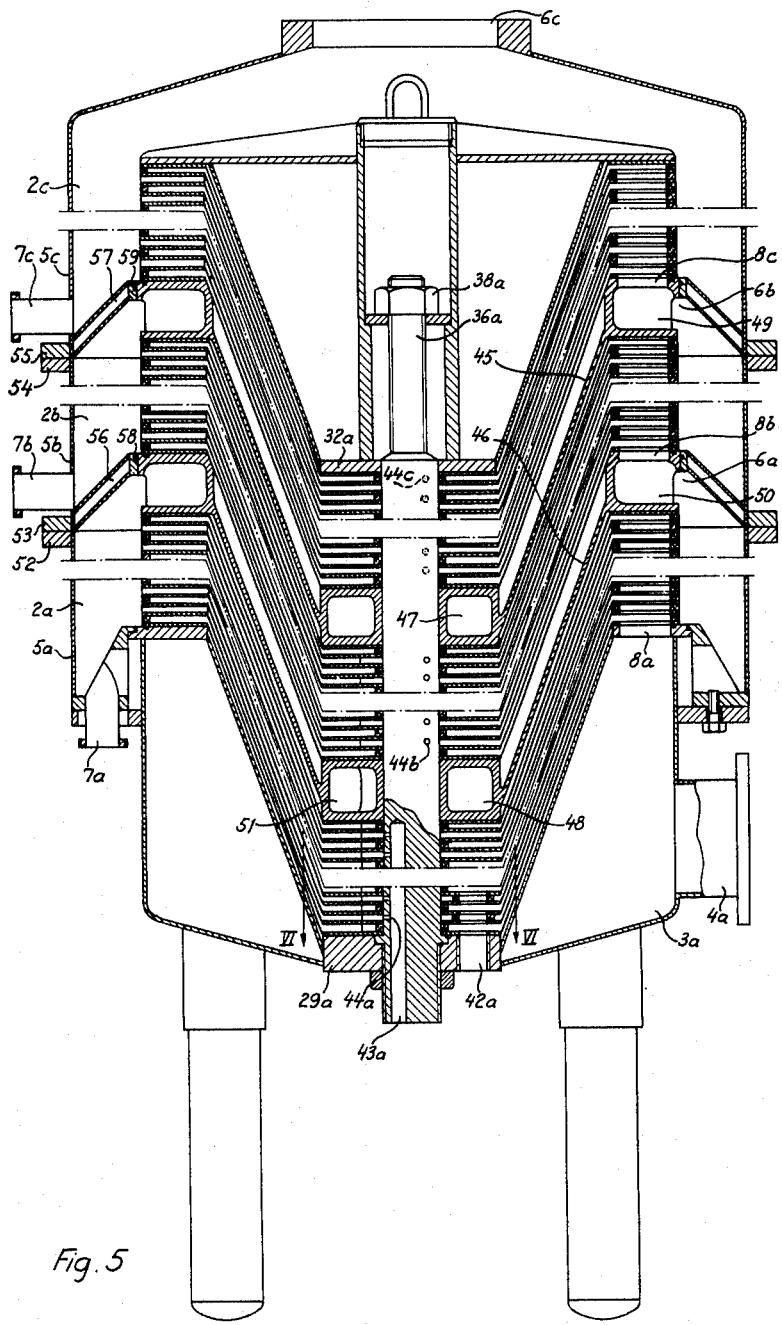
FIG. 5 is a vertical section through a three-stage conical evaporator.

The conical evaporator according to FIGS. 5 and 6 differs from the conical evaporator according to FIGS. 1–4 in that it is divided into three stages by means of partitions, each stage of which functions separately but can be arranged to operate in series with the others by inter-communication pipes (not shown).

The conical evaporator according to FIGS. 5 and 6 is divided into three stages by means of the partitions 45 and 46. The partitions are provided with internal chambers 47, 48 and external chambers 49 and 50, the walls of which are of the same order of diameter as the respective inwardly and outwardly directed flanges of the mantles. The purpose of this arrangement is that the walls of the chambers may serve as thrust-plates when the mantles are clamped together against their gaskets and spacing members.

The bolt 36a which maintains the mantles assembled is longer than the bolt 36 in FIG. 1 and is provided with three axial recesses 43a, 43b and 43c angularly displaced in relation to one another. The first recess 43a communicates with the open channels of the first stage by means of radial passages 44a; the second one 43b communicates with the open channels of the second stage by means of channels 44b; the third one 43c communicates with the open channels of the third stage by means of channels 44c.

The condensate outlet 42a from the first stage corresponds exactly to the outlet 42 in FIG. 1, but there are also (FIG. 6) special outlets 42b and 42c from the second and the third stages, respectively. The condensate outlets are arranged axially and in spaced angular relation to one another in the thrust-plate 29a.

The chamber 47 forms a collecting place for the condensate from the third stage and chamber 48 for that of the second stage. The upper walls of the respective chambers are therefore provided with through-going holes which are in communication with the closed channels of the respective stages, although this is not shown on the drawing. The outlet 42b communicates with the chamber 48 via a closed channel formed by holes in the lower wall of the chamber 48, by through-going holes in the inwardly directed flanges of the first stage and by packings arranged around the holes between all these flanges, although they have not been shown in order not to complicate the drawing. Likewise, the chamber 47 is in communication at the top with the closed channels of the third stage and, at the bottom, in communication with the outlet 42c. Thus, a channel formed by through-going holes and gaskets passes through the inwardly directed flanges of the first and the second stage and through the chamber 48 without any communication with their recesses. For this purpose, the chamber 48 is provided with a through-going channel 51, which is separated from the rest of the chamber 48.

The three chambers 2a, 2b, and 2c, one for each stage, in FIG. 5 correspond to the chamber 2 in FIG. 1. The chambers are formed by walls 5a, 5b and 5c which are tightly assembled to each other by flanges 52, 53, 54, 55 and bolts (not shown). The wall 5b is connected to the partition 46 by means of an internal wall 56 and the wall 5c is connected with the partition 45 by means of an internal wall 57, whereby the chambers 5a, 5b and 5c are separated from each other. The connections between the walls 56 and 46 and between the walls 57 and 45, respectively, can be fixed or, as shown, coupled loosely through gaskets 58 and 59, respectively.

The chambers 5a, 5b and 5c are provided with the concentrate outlets 7a, 7b and 7c, respectively, as well as with the vapor outlets 6a, 6b and 6c. The outlet 6a discharges into the external chamber 50 which communicates with the closed channels of the second stage via the inlet hole 8b. The outlet 6b discharges in the external chamber 49 which communicates with the closed channels of the third stage via the inlet hole 8c.

The conical evaporator according to FIGS. 5 and 6 operates as follows. The heat-emitting medium, preferably a vapor, is fed in through the primary inlet 4a in the lower chamber 3a and passes through the inlet hole 8a in the closed channels of the first stage and is discharged through the outlet 42a. The liquid to be evaporated is fed in through the recess 43a, flows through the passages 44a into the open channels of the first stage from which it is discharged, in form of a mixture of vapor and concentrate, into the chamber 2a. From that chamber the concentrate is discharged through the outlet 7a and conveyed through a pipe (not shown) and a pump to the evaporation liquid inlet 43b of the second stage. From the chamber 2a the vapor is conveyed through the outlet 6a, the external chamber 50 and the inlet hole 8b to the closed channels of the second stage from which it is discharged through the outlet 42b. The concentrate which was admitted to the recess 43b is conveyed through the passages 44b into the open channels of the second stage, from which it is discharged into the chamber 2b. In the chamber 2b a separation into vapor and further concentrated liquid occurs once more. The liquid is discharged through the outlet 7b and admitted, after having passed a pipe and a pump (not shown), into the recess 43c in order to be fed via the passages 44c as liquid to be evaporated into the open channels of the third stage. The vapor from the chamber 2b passes through the vapor outlet 6b, the external chamber 49 and the inlet hole 8c and is admitted, as heat-emitting medium, in the closed channels of the third stage, from which it is discharged in the form of condensate through the outlet 42c. The evaporation liquid is discharged from the open channels of the third stage and is admitted in the chamber 2c from which vapor, formed by evaporation, is discharged through the outlet 6c, usually to a vacuum exhausting device, while the concentrate of the liquid is discharged through the outlet 7c.

We claim:

1. The method of evaporating liquids in a conical heat-exchanger of the type having a series of spaced frusto-conical mantles internested to form channels therebetween, said mantles having their axis of revolution vertically oriented with their larger ends disposed upwardly, the method comprising admitting liquid to be evaporated into alternate channels formed by said mantles at the small diameter end of said channels, admitting a heat-emitting medium into the alternate intervening channels at the larger diameter end of said channels, discharging said liquid from said first alternate channels at their upper ends, thereby establishing parallel flows of said liquid from the small to the large diameter ends of said first alternate channels, discharging said heat-emitting medium from said alternate intervening channels at their lower ends, thereby establishing parallel flows of said medium from the large to the small diameter ends of said alternate intervening channels, and controlling the relationship between the pressure and temperature of the evaporated vapor at the output of the exchanger and the pressure and temperature of the heat-emitting medium in such a manner that vapor of evaporation follows, at the existing pressure, the vaporization curve for the liquid.

2. In an evaporator, a series of internested conical mantles forming a first series of alternate channels for a liquid to be evaporated and a second series of intervening channels for a heating medium, said mantles having at the upper large ends outwardly directed flanges and at their smaller ends inwardly directed flanges, each of said outward directed flanges having heating medium inlet orifices therein, each of said inwardly directed flanges having discharge orifices for said heating medium, a first series of gaskets disposed between alternate pairs of the outer flanges and surrounding said inlet orifices to form a passage to carry the heating medium into said second series of channels, a second series of gaskets disposed between the same alternate pairs of inner flanges and surrounding said discharge orifices therein to form a passage to conduct the heating medium from said second series of channels, a third series of gaskets disposed between the outer flanges in position to close the outer portions of said second series of channels, a fourth series of gaskets disposed between the inner flanges in position to close the inner portions of said second series of channels, and compression means clamping said mantles and intervening gaskets together in an air-tight and leak-proof manner.

3. An evaporator in accordance with claim 2, comprising also a housing surrounding said mantle assembly and forming a chamber communicating with said first series of channels, said chamber having a lower outlet for exhausting the concentrate and an upper outlet for exhausting the vapor resulting from the evaporation.

4. The evaporator of claim 2, wherein the compression means includes an axial bolt surrounded by said inner flanges.

5. The evaporator of claim 2, wherein the compression means includes a hollow bolt having passageways in communication with one series of channels whereby the medium to be evaporated may be admitted to the heat exchanger.

6. An evaporator as in claim 2, comprising also rigid spacer members disposed between adjacent inner and outer flanges.

7. An evaporator as in claim 2, comprising also partition means dividing the mantles into at least two superimposed stages each capable of functioning as an individual evaporator stage.

8. An evaporator in accordance with claim 7, wherein the compression means includes a bolt having a plurality of longitudinal passageways each adapted to interconnect with one of the channels of each of said evaporator stages.

9. An evaporator according to claim 7, comprising also means forming around each evaporator stage a chamber for receiving a mixture of vapor and concentrate from the corresponding channels, each said chamber having an upper outlet for vapor and a lower outlet for concentrate, the concentrate outlet from said chamber of one stage being in communication with the inlet for the liquid to be evaporated in the next stage, the vapor outlet from said chamber of one stage being in communication with the inlet for the heat-emitting medium of the next stage.

10. An evaporator in accordance with claim 3, wherein the first series of gaskets are of such a shape that the evaporation liquid in the form of a mixture of liquid and vapor will be ejected tangentially and with a rotary motion against the wall of the chamber to assist the separation of the liquid and vapor.

11. A conical evaporator in accordance with claim 3, wherein the housing is provided with an additional lower chamber, said additional chamber having an inlet for the heat-emitting medium and being in communication with said heat-emitting medium passage.

12. The evaporator of claim 11 wherein the lower chamber surrounds the lower portion of the mantle assembly to form a steam jacket.

13. In an evaporator, the combination of a plurality of internested mantles each having a conical part and also having radially outwardly directed and radially inwardly directed flanges at the large-diameter and small-diameter ends, respectively, of said conical part, said mantles being spaced axially from each other to form channels each having a conical portion and inner and outer radial portions at the ends of said conical portion, alternate ones of said channels constituting a first series of channels and the other channels constituting a second series of channels alternating with the channels of said first series, said flanges having holes forming a first group of orifices in the outwardly directed flanges and a second group of orifices in the inwardly directed flanges, marginal gaskets closing each channel of said first series at its inner and outer radial portions, respectively, each marginal gasket being compressed between a pair of opposing flanges and extending along the free edges of said opposing flanges, the channels of said second series being open at their respective inner and outer radial portions, outer orifice gaskets located in said outer radial portions of the channels of the second series and each compressed between opposing outer flanges in closely surrounding relation to a pair of outer aligned orifices of said first group, inner orifice gaskets located in said inner radial portions of the channels of the second series and each compressed between opposing inner flanges in closely surrounding relation to a pair of inner aligned orifices of said second group, whereby said orifices and orifice gaskets form outer and inner passages, respectively, which communicate with said closed channels of the first series but are closed to said open channels of the second series, and a hollow tubular member surrounded by said inwardly directed flanges and having radial passages connecting the hollow interior of said member with the open channels of said second series, 14. In an evaporator, the combination of a plurality of internested mantles each having a conical part and also having radially outwardly directed and radially inwardly directed flanges at the large-diameter and small-diameter ends, respectively, of said conical part, said mantles being spaced axially from each other to form channels therebetween each having a conical portion and inner and outer radial portions at the ends of said conical portion, alternate ones of said channels constituting a first series of channels and the other channels constituting a second series of channels alternating with the channels of said first series, said flanges having throughflow orifices, first gasket means compressed between said flanges and closing each channel of said first series at its inner and outer radial portions, respectively, second gasket means compressed between said flanges and contiguously surrounding said orifices to form outer and inner passages, respectively, extending transversely of the flanges and which communicate with said closed channels of the first series but are closed to said channels of the second series, a hollow tubular member surrounded by said inwardly directed flanges and having radial passages connecting the hollow interior of said member with the open channels of said second series, partition means interposed between sets of juxtaposed mantles and dividing the mantles into at least two evaporator stages, and a common housing surrounding said stages and forming separate chambers communicating, respectively, with the first and second series of channels of said stages.

References Cited by the Examiner

UNITED STATES PATENTS

| | | | |
|---|---|---|---|
| 780,612 | 1/1905 | Mayer | 159—13 |
| 1,197,944 | 9/1916 | Munters | 165—166 |
| 2,229,306 | 1/1941 | Prestage | 165—167 |
| 2,314,966 | 3/1943 | Astle | 159—28 |
| 2,510,233 | 6/1950 | Kermer | 159—17 X |
| 2,562,739 | 7/1951 | Risberg | 159—28 X |
| 2,764,233 | 9/1956 | Skinner | 159—13 |
| 2,960,160 | 11/1960 | Goodman | 159—28 X |
| 3,073,380 | 1/1963 | Palmason | 159—49 |
| 3,092,180 | 6/1963 | Dahlgren | 159—6 X |
| 3,150,028 | 9/1964 | Wennerberg | 159—28 |

FOREIGN PATENTS 880,990　10/1961　Great Britain.

NORMAN YUDKOFF, *Primary Examiner.*